United States Patent

Grimminger

Patent Number: 5,958,990
Date of Patent: Sep. 28, 1999

[54] TRIMERIZATION CATALYSTS FOR MAKING POLYISOCYANURATE FOAMS

[75] Inventor: Jobst Grimminger, Henstedt Ulzburg, Germany

[73] Assignee: Air Products and Chemicals, Inc., Allentown, Pa.

[21] Appl. No.: 09/198,002

[22] Filed: Nov. 23, 1998

[51] Int. Cl.$^6$ .............................. C08G 18/22; C08G 18/18
[52] U.S. Cl. .......................... 521/125; 521/128; 521/129; 502/25; 502/26
[58] Field of Search ..................................... 521/125, 128, 521/129

[56] References Cited

U.S. PATENT DOCUMENTS

| | | | |
|---|---|---|---|
| 4,675,401 | 6/1987 | Robin | 521/128 |
| 4,760,099 | 7/1988 | Canaday et al. | 521/128 |
| 5,308,883 | 5/1994 | Londrigan et al. | 521/125 |
| 5,324,754 | 6/1994 | Valoppi et al. | 521/125 |

FOREIGN PATENT DOCUMENTS 19512480  4/1995  Germany .

Primary Examiner—Morton Foelak
Attorney, Agent, or Firm—Michael Leach

[57] ABSTRACT

A method for making a rigid polyurethane/polyisocyanurate foam by reacting a polyisocyanate and a polyol in the presence of a trimerization catalyst and a urethane catalyst, a blowing agent and a silicone surfactant characterized by employing as the trimerization catalyst a compound of the following formula:

$$B^+ {}^-O_2C-X-C(O)-NR-R^1$$

where X is the residue of an organic acid anhydride; R is hydrogen or a C1–C4 alkyl group; $R^1$ is a C1–C4 alkyl or a phenyl group or $Y-NR^2R^3$, where Y is a C2–C6 alkylene group which may contain heteroatoms and $R^2$ and $R^3$, which may be the same or different, are C1–C20 alkyl groups which may contain oxygen atoms or which together with the tertiary nitrogen form a 5 or 6 member ring which may contain oxygen atoms; and B is an alkali metal ion or a substituted or unsubstituted quaternary ammonium ion.

15 Claims, No Drawings

TRIMERIZATION CATALYSTS FOR MAKING POLYISOCYANURATE FOAMS

FIELD OF THE INVENTION

The present invention relates to making polyisocyanurate foams and, more particularly, relates to trimerization catalysts for making rigid polyisocyanurate foams.

BACKGROUND OF THE INVENTION

DE 195 12 480 A1 discloses thermally activated catalysts for making polyurethane foam comprising compounds of the structure

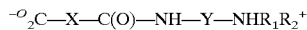

where X is a C2–C3 $\alpha,\omega$-alkylene group, 1,2-substituted cyclohexyl group or ortho-substituted phenylene group; Y is a C2–C6 alkylene group which may contain heteroatoms; and $R_1$ and $R_2$, which may be the same or different, are C1–C20 alkyl groups which may contain oxygen atoms or together with the tertiary nitrogen form a 5 or 6 member ring which may contain oxygen atoms.

SUMMARY OF THE INVENTION

The present invention provides a catalyst composition for catalyzing the trimerization of polyisocyanate in the preparation of a rigid polyurethane (PUR) and/or polyisocyanurate (PIR) foam by the reaction of a polyisocyanate and a polyol in the presence of a blowing agent and, optionally, a urethane catalyst. The trimerization catalyst comprises a salt of the reaction product of an organic acid anhydride and a primary or secondary amine which can also have additional tertiary amine functionality, the catalyst being of the following formula:

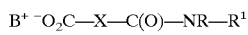

where X is the residue of the acid anhydride; R is hydrogen or a C1–C4 alkyl group; $R^1$ is a C1–C4 alkyl group, a phenyl group or Y—$NR^2R^3$, where Y is a C2–C6 alkylene group which may contain heteroatoms and $R^2$ and $R^3$, which may be the same or different, are C1–C20 alkyl groups which may contain oxygen atoms or which together with the tertiary nitrogen form a 5 or 6 member ring which may contain oxygen atoms; and B is a monovalent cation such as an alkali metal ion or a quaternary ammonium ion.

In this specification and the claims, the terms "polyisocyanurate" and "PIR" are intended to mean polyurethane and/or polyisocyanurate as is understood in the rigid foam art. Thus a rigid polyisocyanurate, or PIR, foam can be a rigid polyurethane and/or polyisocyanurate (PUR/PIR) foam.

Advantageously, in the production of rigid PIR foams, the catalysts of the invention provide for low odor, good curing and controlled reactivity.

DETAILED DESCRIPTION OF THE INVENTION

The process according to the invention can easily be carried out by conventional means for making rigid PIR foam, excepting that the general preparation of rigid PIR foam is carried out using the reaction product of an organic acid anhydride and a primary or secondary amine preferably having additional tertiary amine functionality as the trimerization catalyst.

The rigid PIR foam products are prepared using any suitable organic polyisocyanates well known in the art for making rigid PIR foam including, for example, hexamethylene diisocyanate, isophorone diisocyanate, phenylene diisocyanate, toluene diisocyanate ("TDI") and 4,4'-diphenylmethane diisocyanate ("MDI"). Especially suitable are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Other suitable isocyanates are the 2,4- and 2,6-TDI's individually or together as their commercially available mixtures. Also suitable are "prepolymers" of these polyisocyanates comprising a partially prereacted mixture of a polyisocyanate and a polyether or polyester polyol. Preferably the above polyisocyanates are used in an isocyanate index range of 80 to 400.

Suitable polyols are those polyols typically used in the art for making rigid PIR foam including the polyalkylene ether and polyester polyols. The polyalkylene ether polyols include the poly(alkylene oxide) polymers such as poly (ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, sugars, such as sucrose, and like low molecular weight polyols. Also useful are amine polyether polyols which can be prepared by reacting an amine, such as ethylenediamine, diethylenetriamine, tolylenediamine, diphenylmethanediamine, triethanolamine or the like, with ethylene oxide or propylene oxide.

In the practice of this invention, a single high molecular weight polyether polyol may be used. Also, mixtures of high molecular weight polyether polyols such as mixtures of different multifunctional materials and/or different molecular weight or different chemical composition materials may be used.

Useful polyester polyols include those produced by reacting a dicarboxylic acid with an excess of a diol, for example, adipic acid or phthalic acid/anhydride with ethylene glycol or butanediol, or reacting a lactone with an excess of a diol such as caprolactone with propylene glycol.

The trimerization catalyst comprises a salt of the reaction product of an organic acid anhydride and a primary or secondary amine preferably having additional tertiary amine functionality, the catalyst being of the following formula:

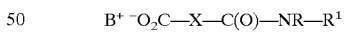

where X is the residue of an organic acid anhydride; R is a C1–C4 alkyl group or preferably hydrogen; $R^1$ is a C1–C4 alkyl group, a phenyl group or preferably Y—$NR^2R^3$; Y is a C2–C6 alkylene group which may be branched or linear and optionally contains heteroatoms (O or N); $R^2$ and $R^3$, which may be the same or different, are C1–C20 alkyl groups which may contain oxygen atoms or which together with the tertiary nitrogen form a 5 or 6 member ring which may contain oxygen atoms; and B is a monovalent cation such as an alkali metal ion or a substituted or unsubstituted quaternary ammonium ion. The any one or all of the substituents on nitrogen atom of the quaternary ammonium ion may contain other functionality such as hydroxyl groups or ether linkages.

X is preferably a C2–C3 alkylene group which optionally may contain a double bond, 1,2-cyclohexylene which optionally may contain a double bond, or orthophenylene. X may be the residue of a cyclic anhydride such as:

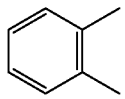

for phthalic anhydride,

for maleic anhydride or

for succinic anhydride. Thus the organic acid anhydrides which are suitable for reacting with the defined amine include maleic anhydride, glutaric anhydride, succinic anhydride, 1,2-cyclohexanedicarboxylic acid anhydride, 3,4-dehydrocyclohexane-1,2-dicarboxylic acid anhydride or phthalic anhydride.

R may be methyl, ethyl, n-propyl, i-propyl, n-butyl, t-butyl, or phenyl, but is preferably hydrogen.

$R^1$ may be methyl, ethyl, n-propyl, i-propyl, n-butyl, t-butyl, but is preferably Y—$NR^2R^3$;

$R^2$ and $R^3$ may be ethyl, n-propyl, -propyl, n-butyl, t-butyl, ethylhexyl and the like but is preferably methyl. When $R^2$ and R are taken together with the nitrogen atom and optional oxygen atom, they may be exemplified by the 5 or 6 member ring groups pyrrolidinyl, piperidyl or morpholinyl.

Y may be branched or linear ethylene, propylene, butylene and the like and as a heteroatom-containing alkylene group the radicals —$CH_2CH_2OCH_2CH_2$— and —$CH_2CH_2CH_2NCH_2CH_2CH_2$— are preferred.

Illustrative of suitable primary or secondary amines are methylamine, dimethylamine, ethylamine, diethylamine, propylamine, methyl ethylamine, aniline and the like. Illustrative of suitable primary or secondary amines also containing tertiary amine functionality are N,N-dimethylethylenediamine,N,N-dimethylpropylenediamine, N,N,N'-trimethylpropylenediamine, N,N,N", N"-tetramethyldipropylenetriamine, N,N-diethylpropylenediamine, N-aminopropylmorpholine, and the like.

The monovalent cation may be any alkali metal ion such as sodium, potassium, or lithium or a quaternary ammonium ion, such as tetramethyl ammonium, trimethylethylammonium or trimethylbenzylammonium and the like, where the alkyl or aralkyl groups on the quaternary nitrogen may contain other functionality such as OH.

The preferred catalyst is of the formula $$B^+ \; {}^-O_2C—X—C(O)—NH—Y—NR^2R^3$$

where B, $R^2$, $R^3$, X and Y are as defined above.

The trimerization catalyst is prepared by dissolving the amino compound in a suitable solvent such as monoethylene glycol (MEG) with heating to 50–70° C. The acid anhydride is slowly added and dissolved keeping the temperature at approximately 100° C. Advantageously, the amino compound and acid anhydride are reacted in a 1:1 molar ratio although other molar ratios can be used. The resulting reaction mixture is then cooled to approximately 60° C. while stirring. The salts are prepared by adding the appropriate hydroxide, e.g., KOH, to the half-amide reaction product and maintaining 60° C.

In addition to the trimerization catalyst, the catalyst composition used in the rigid foam formulation may also contain any urethane catalyst (gelling and/or blowing) well known in the art such as tertiary amines, organotin and carboxylate urethane catalysts. Typical examples of useful catalysts are amine catalysts such as triethylenediamine, dimethylcyclohexylamine, tetramethylhexanediamine, bis(dimethylaminoethyl)ether, tri(dimethylaminopropyl) hexahydrotriamine, 1-isobutyl-2-methylimidazole, 1,2-dimethylimidazole, dimethylaminoethanol, diethylaminoethanol, pentamethyldiethylenetriamine, pentamethyldipropylenetriamine, methyl morpholine, ethyl morpholine, quaternary ammonium salts, salts of an organic acid and tin catalysts such as dibutyltin dilaurate and the like.

A catalytically effective amount of the catalyst composition is used in the PIR formulation. More specifically, suitable amounts of the catalyst composition may range from about 0.01 to 10 parts by weight per 100 parts polyol (0.01 to 10 pphpp) in the PIR formulation, preferably 0.5 to 4 pphpp.

Other typical agents which may be used in the PIR rigid foam formulations include blowing agents such as water, methylene chloride, chlorofluorocarbons (CFCs), hydrochlorofluorocarbons (HCFCs) such as HCFC-141b, HCFC-22 or HCFC-123, pentane and the like, cell stabilizer surfactants such as organopolysiloxanes, flame retardants such as halogenated organophosphorus compounds and chain extenders such as ethylene glycol and butanediol.

A general PIR rigid foam formulation having a 1.5–2.5 lb/ft³ (24–40 kg/m³) density (e.g., boardstock foam) containing a trimerization catalyst according to the invention would comprise the following components in parts by weight (pbw):

| Rigid Foam Formulation | pbw |
|---|---|
| Polyol | 100 |
| Silicone Surfactant | 1–3 |
| Blowing Agent | 20–40 |
| Water | 0–3 |
| Trimerization Catalyst | 0.2–10 |
| Urethane Catalyst | 0.1–5 |
| Isocyanate Index | 80–400 |

EXAMPLE 1

This example shows making the dimethylaminopropyl half-amide of maleic acid (HMMDMAPA) and the corresponding potassium salt (KMMDMAPA) by reacting maleic anhydride and dimethylaminopropylamine (DMAPA). Dimethylaminopropylamine (10.2 g; 0.1 mole) was dissolved in monoethylene glycol (23 ml) with heating. Maleic anhydride (9.8 g; 0.1 mole) was slowly added and dissolved keeping the temperature at about 100° C. The resulting reaction mixture was cooled to about 60° C. while stirring.

The salt was prepared by adding 5.6 g (0.1 mole) KOH to the half-amide reaction product and maintaining 60° C.

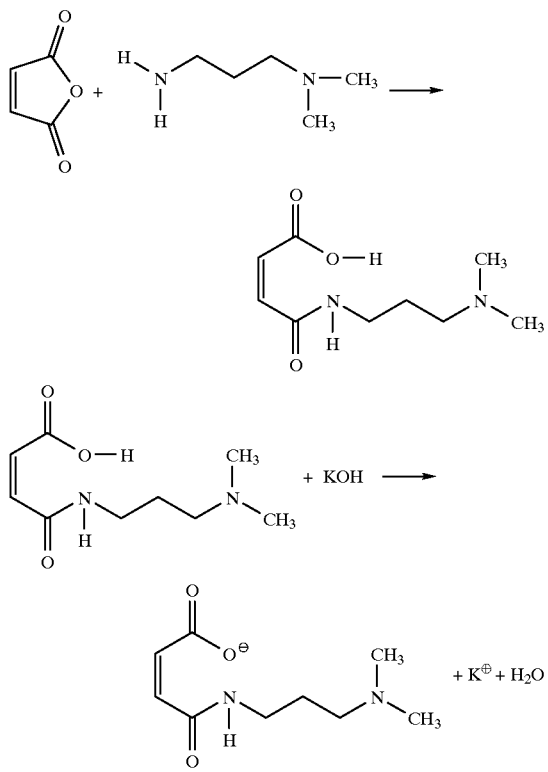

EXAMPLE 2

This example shows the reaction product of maleic anhydride and N,N,N",N"-tetramethyldipropylenetriamine (Polycat 15 catalyst) to make the Polycat 15 half-amide of maleic acid (HMMPC15) and the corresponding potassium salt (KMMPC15). The procedure of Example 1 was followed, except that 18.73 g (0.1 mole) of Polycat 15 catalyst was used instead of DMAPA.

EXAMPLE 3

This example shows the reaction product of phthalic anhydride and dimethylaminopropylamine (DMAPA) to make the DMAPA half-amide of phthalic acid (HPMDMAPA) and the corresponding potassium salt (KPMDMAPA). The procedure of Example 1 was followed, except that 14.8 g (0.1 mole) phthalic anhydride was used in place of the maleic anhydride.

EXAMPLE 4

This example shows the reaction product of phthalic anhydride and N,N,N",N"-tetramethyldipropylenetriamine (Polycat 15 catalyst) to make the Polycat 15 half-amide of phthalic acid (HPMPC15) and the corresponding potassium salt (KPMPC15). The procedure of Example 3 was followed, except that 18.73 g Polycat 15 catalyst was used in place of the DMAPA.

EXAMPLE 5

This example shows the reaction product of maleic anhydride and aniline to make the half-anilide of maleic acid (MMANILIDE) and the corresponding potassium salt (KMMANILIDE). The procedure of Example 1 was followed except that 9.3 g (0.1 mole) aniline was used in place of the DMAPA.

EXAMPLE 6

The catalysts of Examples 1–2 were evaluated in a typical European pentane blown PIR rigid foam formulation shown in Table 1 and compared with currently used PIR catalysts Dabco TMR catalyst and potassium acetate. The results are shown in Table 2.

TABLE 1

| Component | Parts by Weight |
| --- | --- |
| Terate 2540 Polyol[a] | 80 |
| Arcol 3541 Polyol[b] | 20 |
| Armgard V490[c] | 10 |
| Polycat 5 Catalyst[d] | 0.2 |
| Trimer Catalyst | See Table 2 |
| Water | 1.3 |
| n-Pentane | 13 |
| Dabco DC 5598[e] | 2.0 |
| Crude MDI | NCO Index = 250 |

[a]Polyester polyol, OH number = 260
[b]Polyether polyol, OH number = 470
[c]Flame retardant
[d]Pentamethyldiethylenetriamine
[e]Polysiloxane surfactant KMMDMAPA and KMMPC15, the catalysts according to the invention, provided similar activity to the conventional PIR catalysts potassium acetate and Dabco TMR catalyst in conjunction with significantly improved flowability. Dabco TMR catalyst is well known for providing excellent flowability compared to potassium carboxylates. The phthalic anhydride based catalysts showed significantly lower activity compared to the maleic anhydride based products. (HSG means Height at String Gel and is a measure of the flowability of a foam as it gives information about the volume % generated before gellation occurs to the extent that the foam is no longer free flowable at string gel time.)

TABLE 2

| Catalyst | Use Level (pphpp) | HSG (%) |
| --- | --- | --- |
| Potassium Acetate | 2.50 | 43.1 |
| DABCO TMR | 1.90 | 52.3 |
| KMMDMAPA | 2.00 | 64.4 |
| KMMPC15 | 2.00 | 63.3 |

The results of the reactivity test for HMMDMAPA and KMMDMAPA in the rigid foam formulation of Table 1 are shown in Table 3 where the height (mm) of the developing foam is given at the stated intervals (seconds).

TABLE 3

| Trimer Catalyst (pphpp) | 25 s (mm) | 50 s (mm) | 75 s (mm) | 100 s (mm) | 125 s (mm) | 150 s (mm) | 200 s (mm) | 250 s (mm) | 300 s (mm) |
|---|---|---|---|---|---|---|---|---|---|
| None | 8 | 8 | 10 | 18 | 27 | 35 | 52 | 70 | 88 |
| HMMDMAPA (4) | 8 | 11 | 31 | 59 | 85 | 103 | 122 | 130 | 130 |
| HMMDMAPA (6) | 8 | 17 | 42 | 71 | 100 | 112 | 125 | 130 | 130 |
| HMMDMAPA (8) | 8 | 20 | 50 | 80 | 104 | 116 | 126 | 130 | 130 |
| KMMDMAPA (4) | 13 | 75 | 130 | 160 | 172 | 176 | 178 | 178 | 178 |
| KMMDMAPA (6) | 22 | 119 | 168 | 183 | 187 | 188 | 188 | 188 | 188 |
| KMMDMAPA (8) | 30 | 141 | 192 | 200 | 205 | 205 | 205 | 205 | 205 |

As can be seen the reactivity of the inner salt HMMDMAPA was significantly lower than that of KMMDMAPA and the foams did not cure at all. The reactivity profile of HMMDMAPA did not show any PIR kick soon after reaction initiation.

STATEMENT OF INDUSTRIAL APPLICATION

The present invention provides trimerization catalysts for making rigid PIR foam.

I claim:

1. In a method for making a rigid polyurethane/polyisocyanurate foam by reacting a polyisocyanate and a polyol in the presence of a catalyst composition comprising a trimerization catalyst and, optionally, a urethane catalyst, a blowing agent, and, optionally, water, the improvement which comprises employing as the trimerization catalyst a compound of the following formula:

$$B^{30} \ ^-O_2C\text{---}X\text{---}C(O)\text{---}NR\text{---}R^1$$

where X is the residue of an organic acid anhydride; R is hydrogen or a C1–C4 alkyl group; $R^1$ is a C1–C4 alkyl or a phenyl group or Y—$NR^2R^3$, where Y is a C2–C6 alkylene group which may contain heteroatoms and $R^2$ and $R^3$, which may be the same or different, are C1–C20 alkyl groups which may contain oxygen atoms or which together with the tertiary nitrogen form a 5 or 6 member ring which may contain oxygen atoms; and B is an alkali metal ion or a quaternary ammonium ion.

2. The method of claim 1 in which X is a C2–C3 alkylene group which optionally may contain a double bond, a 1,2-cyclohexylene group which optionally may contain a double bond, or an ortho-phenylene group.

3. The method of claim 1 in which R is hydrogen.

4. The method of claim 1 in which $R^1$ is Y—$NR^2R^3$ where Y is a C2–C6 alkylene group which may contain heteroatoms and $R^2$ and $R^3$, which may be the same or different, are C1–C20 alkyl groups which may contain oxygen atoms or which together with the tertiary nitrogen form a 5 or 6 member ring which may contain oxygen atoms.

5. The method of claim 1 in which B is a sodium, potassium or lithium cation.

6. The method of claim 1 in which X is the residue of maleic anhydride, glutaric anhydride, succinic anhydride, 1,2-cyclohexane-dicarboxylic acid anhydride, 3,4-dehydrocyclohexane-1,2-dicarboxylic acid anhydride or phthalic anhydride.

7. The method of claim 1 in which and $R^2$ and $R^3$, are methyl, ethyl, or when taken together with the nitrogen atom are pyrrolidinyl, piperidyl or morpholinyl.

8. The method of claim 4 in which and $R^2$ and $R^3$, are methyl, ethyl, or when taken together with the nitrogen atom are pyrrolidinyl, piperidyl or morpholinyl.

9. The method of claim 8 in which Y is —$CH_2CH_2CH_2$— or —$CH_2CH_2CH_2NCH_2CH_2CH_2$—.

10. In a method for making a rigid polyurethane/polyisocyanurate foam by reacting a polyisocyanate and a polyol in the presence of a catalyst composition comprising a trimerization catalyst and a urethane catalyst, a blowing agent, optionally water, and a silicone surfactant, the improvement which comprises employing as the trimerization catalyst a compound of the following formula:

$$B^+ \ ^-O_2C\text{---}X\text{---}C(O)\text{---}NH\text{---}Y\text{---}NHR^2R^3$$

where X is the residue of an organic acid anhydride which is maleic anhydride, glutaric anhydride, succinic anhydride, 1,2-cyclohexane-dicarboxylic acid anhydride, 3,4-dehydrocyclohexane-1,2-dicarboxylic acid anhydride or phthalic anhydride; Y is a C2–C6 alkylene group which may contain heteroatoms and $R^2$ and $R^3$, which may be the same or different, are methyl, ethyl, propyl or butyl, or together with the tertiary nitrogen are pyrrolidinyl, piperidyl or morpholinyl; and B is a sodium, potassium, lithium ion or a substituted or unsubstituted quaternary ammonium ion.

11. The method of claim 10 in which X is the residue of maleic anhydride or phthalic anhydride.

12. The method of claim 11 in which Y is ethylene, propylene or —$CH_2CH_2CH_2NCH_2CH_2CH_2$—.

13. The method of claim 11 in which $R^2$ and $R^3$, which may be the same or different, are methyl or ethyl.

14. The method of claim 11 in which B is sodium or potassium ion.

15. A polyurethane/polyisocyanurate rigid foam prepared by reacting the following composition in parts by weight (pbw):

| Component | pbw |
|---|---|
| Polyol | 100 |
| Silicone Surfactant | 1–3 |
| Blowing Agent | 20–40 |
| Water | 0–3 |
| Trimerization Catalyst | 0.2–10 |
| Urethane Catalyst | 0.1–5 |
| Isocyanate Index | 80–400 | the trimerization catalyst being of the following formula:

$$B^+ \ ^-O_2C\text{---}X\text{---}C(O)\text{---}NR\text{---}R^1$$

where X is the residue of an organic acid anhydride; R is hydrogen or a C1–C4 alkyl group; $R^1$ is a C1–C4 alkyl group, a phenyl group or Y—$NR^2R^3$, where Y is a C2–C6 alkylene group which may contain heteroatoms and $R^2$ and $R^3$, which may be the same or different, are C1–C20 alkyl groups which may contain oxygen atoms or together with the tertiary nitrogen form a 5 or 6 member ring which may contain oxygen atoms; and B is an alkali metal ion or a substituted or unsubstituted quaternary ammonium ion.

* * * * *

UNITED STATES PATENT AND TRADEMARK OFFICE
CERTIFICATE OF CORRECTION

PATENT NO. : 5,958,990
DATED : 28 September 1999
INVENTOR(S) : Jobst Grimminger It is certified that error appears in the above-identified patent and that said Letters Patent is hereby corrected as shown below:

Column 7, Claim 1, line 31, the formula should read:

$$B^+ \quad {}^-O_2C\text{-}X\text{-}C(O)\text{-}NR\text{-}R^1$$

Signed and Sealed this

Fourth Day of April, 2000

Q. TODD DICKINSON

*Attest:*

*Attesting Officer*    *Director of Patents and Trademarks*